United States Patent
Ismail et al.

(10) Patent No.: US 10,072,962 B2
(45) Date of Patent: Sep. 11, 2018

(54) LIQUID OUT-OF-PRODUCT ALARM SYSTEM AND METHOD

(71) Applicant: ECOLAB USA INC., St. Paul, MN (US)

(72) Inventors: Husam Ismail, Eagen, MN (US); Kenneth Thomas Dobizl, Mounds View, MN (US); Louis Mark Holzman, Bloomington, MN (US); Sonya Shailesh Sharpe, Eagan, MN (US); Jason Andrew Kahlhamer, Inver Grove Heights, MN (US); Matthew Frank Zurbey, Cottage Grove, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/202,002

(22) Filed: Jul. 5, 2016

(65) Prior Publication Data
US 2018/0010950 A1 Jan. 11, 2018

(51) Int. Cl.
G08B 21/00 (2006.01)
G01F 23/292 (2006.01)
G08B 21/18 (2006.01)

(52) U.S. Cl.
CPC ......... *G01F 23/292* (2013.01); *G08B 21/182* (2013.01)

(58) Field of Classification Search
None
See application file for complete search history.

(56) References Cited

U.S. PATENT DOCUMENTS

| 1,991,192 A | 2/1935 | Bucky |
| 2,873,714 A | 2/1959 | Bauerlein |

(Continued)

FOREIGN PATENT DOCUMENTS

| AU | 623046 B2 | 4/1992 |
| CA | 2267812 A1 | 10/2000 |

(Continued)

OTHER PUBLICATIONS

OPTEK Technology, Inc., "Sensing and Control: Tube Liquid Sensor," OPB350 / OCB350 Series, Issue 1, Apr. 2016, 11 pages.

(Continued)

*Primary Examiner* — Curtis King
(74) *Attorney, Agent, or Firm* — Fredrikson & Byron, P.A.

(57) ABSTRACT

An out-of-product alarm process includes initiating an out-of-product check by sending a signal to a controller from an optical sensor assembly connected to a fluid delivery medium for delivering a product to a fluid dispensing site, performing an out-of-product check, running an alarm cycle with the controller after receipt of an out-of-product signal, and executing a corrective action. Performing the out-of-product check includes directing light into the fluid delivery medium, generating a detector output based on detected light within the fluid delivery medium, determining an out-of-product state within the fluid delivery medium based on a comparison of the detector output to an out-of-product threshold, starting an out-of-product timer, when the out-of-product state is determined, and determining an out-of-product event when the out-of-product timer reaches a threshold out-of-product time period.

25 Claims, 12 Drawing Sheets

(56) References Cited

U.S. PATENT DOCUMENTS

| | | | |
|---|---|---|---|
| 3,808,887 A * | 5/1974 | Buttriss | G01F 23/2922 116/DIG. 5 |
| 4,114,144 A | 9/1978 | Hyman | |
| 4,142,539 A | 3/1979 | Shih et al. | |
| 4,203,099 A | 5/1980 | Edwards | |
| 4,286,464 A | 9/1981 | Tauber et al. | |
| 4,366,384 A | 12/1982 | Jensen | |
| 4,532,936 A | 8/1985 | Leveen et al. | |
| 4,764,166 A * | 8/1988 | Spani | A61M 5/365 604/122 |
| 4,784,643 A * | 11/1988 | Siretchi | G01P 13/0086 604/122 |
| 4,816,695 A | 3/1989 | Lavin | |
| 4,829,448 A | 5/1989 | Balding et al. | |
| 4,884,065 A | 11/1989 | Crouse et al. | |
| 4,961,069 A | 10/1990 | Tsaprazis | |
| 5,056,554 A | 10/1991 | White | |
| 5,083,862 A * | 1/1992 | Rusnak | G01N 21/85 250/574 |
| 5,156,048 A * | 10/1992 | DeFigueiredo | G01F 23/74 200/84 R |
| 5,199,308 A | 4/1993 | Lawhon et al. | |
| 5,417,233 A | 5/1995 | Thomas et al. | |
| 5,539,670 A * | 7/1996 | Maltby | G01B 7/06 324/648 |
| 5,551,309 A | 9/1996 | Goossens et al. | |
| 5,559,339 A * | 9/1996 | Domanik | G01N 35/1016 250/222.1 |
| 5,562,132 A | 10/1996 | Siegele et al. | |
| 5,625,344 A * | 4/1997 | Shukla | G01F 23/003 200/220 |
| 5,672,887 A | 9/1997 | Shaw et al. | |
| 5,680,111 A | 10/1997 | Danby et al. | |
| 5,684,463 A * | 11/1997 | Diercks | F24F 11/0086 340/584 |
| 5,767,775 A * | 6/1998 | Shukla | B01F 13/0818 200/220 |
| 6,057,772 A | 5/2000 | Burkett | |
| 6,057,773 A * | 5/2000 | Shukla | B01F 13/0818 200/61.45 R |
| 6,163,714 A | 12/2000 | Stanley et al. | |
| 6,212,936 B1 * | 4/2001 | Meisberger | A61M 5/365 73/19.03 |
| 6,292,104 B1 * | 9/2001 | Wakabayashi | G01F 23/266 340/612 |
| 6,543,493 B2 | 4/2003 | Jursich et al. | |
| 6,631,639 B1 * | 10/2003 | Dam | G01F 23/2961 340/621 |
| 6,632,124 B2 | 10/2003 | Adams et al. | |
| 6,648,436 B2 | 11/2003 | Maeda | |
| 6,668,645 B1 | 12/2003 | Gilmour et al. | |
| 6,753,527 B1 * | 6/2004 | Yamagishi | G01F 23/2921 250/223 B |
| 6,767,075 B1 | 7/2004 | Takada et al. | |
| 6,806,947 B1 | 10/2004 | Ekdahl et al. | |
| 6,819,250 B2 | 11/2004 | Nishioka | |
| 6,885,306 B2 * | 4/2005 | Holzman | G01P 13/0006 340/606 |
| 6,975,216 B2 * | 12/2005 | Tharman | F01M 11/12 340/438 |
| 7,040,728 B2 | 5/2006 | Merz et al. | |
| 7,124,913 B2 | 10/2006 | Birtcher et al. | |
| 7,172,259 B2 | 2/2007 | Uchikata | |
| 7,199,388 B2 | 4/2007 | Omatoi | |
| 7,233,241 B2 | 6/2007 | Overhultz et al. | |
| 7,372,063 B2 * | 5/2008 | Castro | G01N 21/49 250/573 |
| 7,508,318 B2 | 3/2009 | Casella et al. | |
| 7,640,876 B2 | 1/2010 | Memory | |
| 7,654,421 B2 | 2/2010 | Chan et al. | |
| 7,694,589 B2 | 4/2010 | Mehus et al. | |
| 7,783,380 B2 | 8/2010 | York et al. | |
| 7,924,424 B2 | 4/2011 | Erickson et al. | |
| 7,955,797 B2 | 6/2011 | McManus et al. | |
| 8,001,811 B2 | 8/2011 | Hahm et al. | |
| 8,004,683 B2 | 8/2011 | Tokhtuev et al. | |
| 8,322,571 B2 | 12/2012 | Hovinen et al. | |
| 8,510,887 B2 | 8/2013 | Hasse et al. | |
| 8,539,812 B2 | 9/2013 | Stringham et al. | |
| 8,865,002 B2 | 10/2014 | Weigle et al. | |
| 8,921,760 B2 | 12/2014 | Qi et al. | |
| 8,944,286 B2 | 2/2015 | Mehus et al. | |
| 9,075,042 B2 | 7/2015 | Cook et al. | |
| 9,140,648 B2 | 9/2015 | Tokhtuev et al. | |
| 9,265,383 B2 | 2/2016 | Yang et al. | |
| 2002/0088823 A1 | 7/2002 | Tabacchi et al. | |
| 2002/0170354 A1 * | 11/2002 | Monsrud | G01N 9/36 73/305 |
| 2002/0170861 A1 * | 11/2002 | Monsrud | G01N 9/36 210/744 |
| 2004/0045096 A1 | 3/2004 | Mani et al. | |
| 2004/0124988 A1 * | 7/2004 | Leonard | B05B 11/0054 340/612 |
| 2005/0195087 A1 * | 9/2005 | Thompson | B67D 1/0021 340/603 |
| 2006/0119484 A1 * | 6/2006 | Chishima | G01G 17/04 340/612 |
| 2006/0187069 A1 * | 8/2006 | Duan | G01N 21/59 340/606 |
| 2006/0208913 A1 * | 9/2006 | Christoffersen | B67D 1/0878 340/612 |
| 2006/0255061 A1 * | 11/2006 | Frieze | A61L 2/18 222/64 |
| 2007/0125162 A1 * | 6/2007 | Ghazi | G01F 1/007 73/149 |
| 2008/0156092 A1 | 7/2008 | Boiarski | |
| 2008/0191153 A1 | 8/2008 | Marganski et al. | |
| 2008/0210607 A1 * | 9/2008 | Owen | E03C 1/26 210/86 |
| 2009/0008409 A1 | 1/2009 | Verhoeven et al. | |
| 2009/0031797 A1 * | 2/2009 | Das | G01F 1/007 73/227 |
| 2009/0050809 A1 | 2/2009 | Holec | |
| 2009/0097029 A1 * | 4/2009 | Tokhtuev | A61M 5/1684 356/409 |
| 2009/0220989 A1 | 9/2009 | Tyagarajan et al. | |
| 2009/0262351 A1 * | 10/2009 | Erickson | A61M 5/1684 356/409 |
| 2010/0132748 A1 | 6/2010 | Kessler et al. | |
| 2010/0141460 A1 * | 6/2010 | Tokhtuev | A61M 5/1684 340/621 |
| 2010/0214106 A1 * | 8/2010 | Braun | A61M 5/1684 340/618 |
| 2010/0251780 A1 | 10/2010 | Im et al. | |
| 2010/0327884 A1 | 12/2010 | McCall et al. | |
| 2011/0094299 A1 * | 4/2011 | Muller | G01F 23/0076 73/290 V |
| 2011/0174070 A1 * | 7/2011 | Arnold | G01F 23/0053 73/299 |
| 2012/0097567 A1 * | 4/2012 | Zhao | A47G 23/16 206/459.1 |
| 2012/0279987 A1 | 11/2012 | Ophardt et al. | |
| 2013/0240554 A1 | 9/2013 | Straahlin et al. | |
| 2014/0014684 A1 | 1/2014 | Classen et al. | |
| 2014/0188404 A1 | 7/2014 | Von Herzen et al. | |
| 2014/0226149 A1 * | 8/2014 | Coates | G01F 23/292 356/51 |
| 2014/0251006 A1 | 9/2014 | Freudenberg et al. | |
| 2014/0318580 A1 | 10/2014 | Cantrell et al. | |
| 2015/0013646 A1 * | 1/2015 | Qi | G01F 23/263 123/478 |
| 2015/0082882 A1 * | 3/2015 | Antocci | G01F 23/168 73/301 |
| 2015/0136991 A1 | 5/2015 | van der Velden | |
| 2015/0233751 A1 | 8/2015 | Blake et al. | |

(56) References Cited

U.S. PATENT DOCUMENTS

| | | | |
|---|---|---|---|
| 2015/0257844 | A1 | 9/2015 | Bommarito et al. |
| 2016/0109277 | A1* | 4/2016 | Hunt .............. G01F 22/00 356/5.01 |

FOREIGN PATENT DOCUMENTS

| | | |
|---|---|---|
| CN | 201840720 U | 5/2011 |
| CN | 102634960 A | 8/2012 |
| CN | 101994236 B | 10/2012 |
| CN | 102199852 B | 4/2015 |
| CN | 204434974 U | 7/2015 |
| CN | 104833376 A | 8/2015 |
| DE | 3240047 A1 | 5/1984 |
| DE | 10201769 A1 | 6/2003 |
| DE | 102010002589 A1 | 9/2011 |
| DE | 102010040690 A1 | 3/2012 |
| EP | 239253 A2 | 9/1987 |
| EP | 143901 B1 | 6/1988 |
| EP | 622616 B1 | 5/1998 |
| EP | 881080 B1 | 9/2002 |
| EP | 2808678 A2 | 12/2014 |
| FR | 2660755 A1 | 10/1991 |
| FR | 2783601 A1 | 3/2000 |
| FR | 2894996 A1 | 6/2007 |
| GB | 2001752 A | 2/1979 |
| GB | 2266898 A | 11/1993 |
| GB | 2448082 A | 10/2008 |
| JP | S63243722 A | 10/1988 |
| JP | H03168186 A | 7/1991 |
| JP | 2005180240 A | 7/2005 |
| JP | 2006010597 A | 1/2006 |
| JP | 2006075192 A | 3/2006 |
| JP | 2012063328 A | 3/2012 |
| KR | 0156133 B1 | 7/1998 |
| KR | 20030021886 A | 3/2003 |
| KR | 20080018017 A | 2/2008 |
| KR | 20080051146 A | 6/2008 |
| KR | 20080092197 A | 10/2008 |
| KR | 20120111555 A | 10/2012 |
| WO | 2009047721 A2 | 4/2009 |
| WO | 2012083286 A2 | 6/2012 |

OTHER PUBLICATIONS

DEMA Engineering Company, "84-65-48 and 84-65-49 Low Level Alarm," Brochure, Retrieved from http://www.demaeng.com/laundry/accessories-parts/84-65-48-and-84-65-49-low-level-alarm/, known to be publicly available on or before May 27, 2016, 2 pages.

International Patent Application No. PCT/US2017/039497, International Search Report and Written Opinion dated Sep. 4, 2017, 15 pages.

* cited by examiner

LIQUID OUT-OF-PRODUCT ALARM SYSTEM AND METHOD

TECHNICAL FIELD

This disclosure relates to an out-of-product alarm system that alerts to the absence of a product in a fluid delivery medium.

BACKGROUND

Fluid dispensing systems typically deliver quantities of fluid to one or more components within the system. In certain fields, fluid dispensing systems may deliver small quantities of fluid. For example, in the medical field, a fluid dispensing system may be used to deliver small quantities of fluid into a patient's vascular system. However, in certain other fields, fluid dispensing systems may deliver larger quantities of fluid. For example, in a large-scale hotel or other laundry or restaurant facility, a fluid dispensing system may need to deliver large quantities of detergent, rinse agent, bleach or other cleaning agents on a continual basis.

In fluid delivery systems where large quantities of fluid are delivered, the fluid is usually supplied automatically. In such systems, the supply source (such as a bottle) and fluid delivery medium (such as a supply tube) are frequently integrated with the device to which the fluid is delivered, such as a warewasher or a laundry machine. This makes it more difficult for the operator to check on the remaining amount of the fluid remaining in the supply source and often results in the system running out of fluid during a cleaning cycle. Additionally, even if an out-of-product alarm is employed, the properties of many fluids, including those used in ware washing, result in frequent false alarms.

SUMMARY

In general, this disclosure relates to an out-of-product alarm system that employs an optical detection sensor that detects the presence or absence of a product in a fluid delivery medium. For example, in a fluid dispensing system in which one or more products are delivered, one or more such sensors may be utilized to detect presence or absence of product within the fluid delivery medium. The system detects presence or absence of product in the fluid dispensing system and provides an out-of-product alert when an out-of-product event is determined. The system prevents false out-of-product alarms by accounting for fluid properties of the product and for functionality issues with the fluid dispensing system.

In one example, this disclosure is directed to an out-of-product alarm process including initiating an out-of-product check by sending a signal to a controller from an optical sensor assembly connected to a fluid delivery medium for delivering a product to a fluid dispensing site, performing an out-of-product check, running an alarm cycle with the controller after receipt of an out-of-product signal, and executing a corrective action. Performing the out-of-product check includes directing light into the fluid delivery medium, generating a detector output based on detected light within the fluid delivery medium, determining an out-of-product state within the fluid delivery medium based on a comparison of the detector output to an out-of-product threshold, starting an out-of-product timer, when the out-of-product state is determined, and determining an out-of-product event when the out-of-product timer reaches a threshold out-of-product time period.

In another example, this disclosure is directed to an out-of-product alarm system including a fluid dispensing system with a product reservoir, a fluid dispensing site, and a fluid delivery medium for delivering a product from the product reservoir to the fluid dispensing site. The out-of-product alarm system also includes a sensor assembly connected to the fluid delivery medium. The sensor assembly includes an emitter that directs light into the fluid delivery medium in which presence or absence of a product is to be determined, a detector that generates a detector output based on detection of light transmitted through the fluid delivery medium, and a sensor controller that determines an out-of-product state within the fluid delivery medium based on a comparison of the detector output to an out-of-product threshold. The out-of-product alarm system also includes an out-of-product timer configured to start when the out-of-product state is determined by the sensor controller, and a system controller configured to generate at least one of a visual alarm and a sound alarm when the out-of-product timer reaches a threshold out-of-product time period, indicating that an out-of-product event is determined.

In another example, this disclosure is directed to an out-of-product alarm process including initiating an out-of-product check by sending a signal to a controller from an optical sensor assembly connected to a fluid delivery medium for delivering a product to a fluid dispensing site, performing an out-of-product check, running an alarm cycle with the controller after receipt of an out-of-product signal, and executing a corrective action in response to the alarm cycle. Performing the out-of-product check includes directing light into the fluid delivery medium, generating a detector output based on detected light within the fluid delivery medium, determining an out-of-product state within the fluid delivery medium based on a comparison of the detector output to an out-of-product threshold, starting an out-of-product timer, when the out-of-product state is determined, and determining an out-of-product event when the out-of-product timer reaches a threshold out-of-product time period.

The out-of-product alarm process also includes performing a product present check and canceling the alarm cycle, stopping and resetting the out-of-product timer upon determination of a product present event; and canceling the alarm cycle upon determination of the product present event. The product present check includes directing light into the fluid delivery medium, generating a detector output based on detected light within the fluid delivery medium, determining a product present state within the fluid delivery medium based on a comparison of the detector output to a product present threshold, starting a product present timer, if the product present timer has not already been started, when a product present state is determined, and determining a product present event when the product present timer reaches a threshold product present time period.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the disclosure in any way. Rather, the following description provides some practical illustrations for implementing examples of the present disclosure. Examples of constructions, materials, dimensions, and manufacturing processes are provided for selected elements, and all other elements employ that which is known to those of ordinary skill in the field of the disclosure. Those skilled in the art will recognize that many of the noted examples have a variety of suitable alternatives.

Figure 1A:
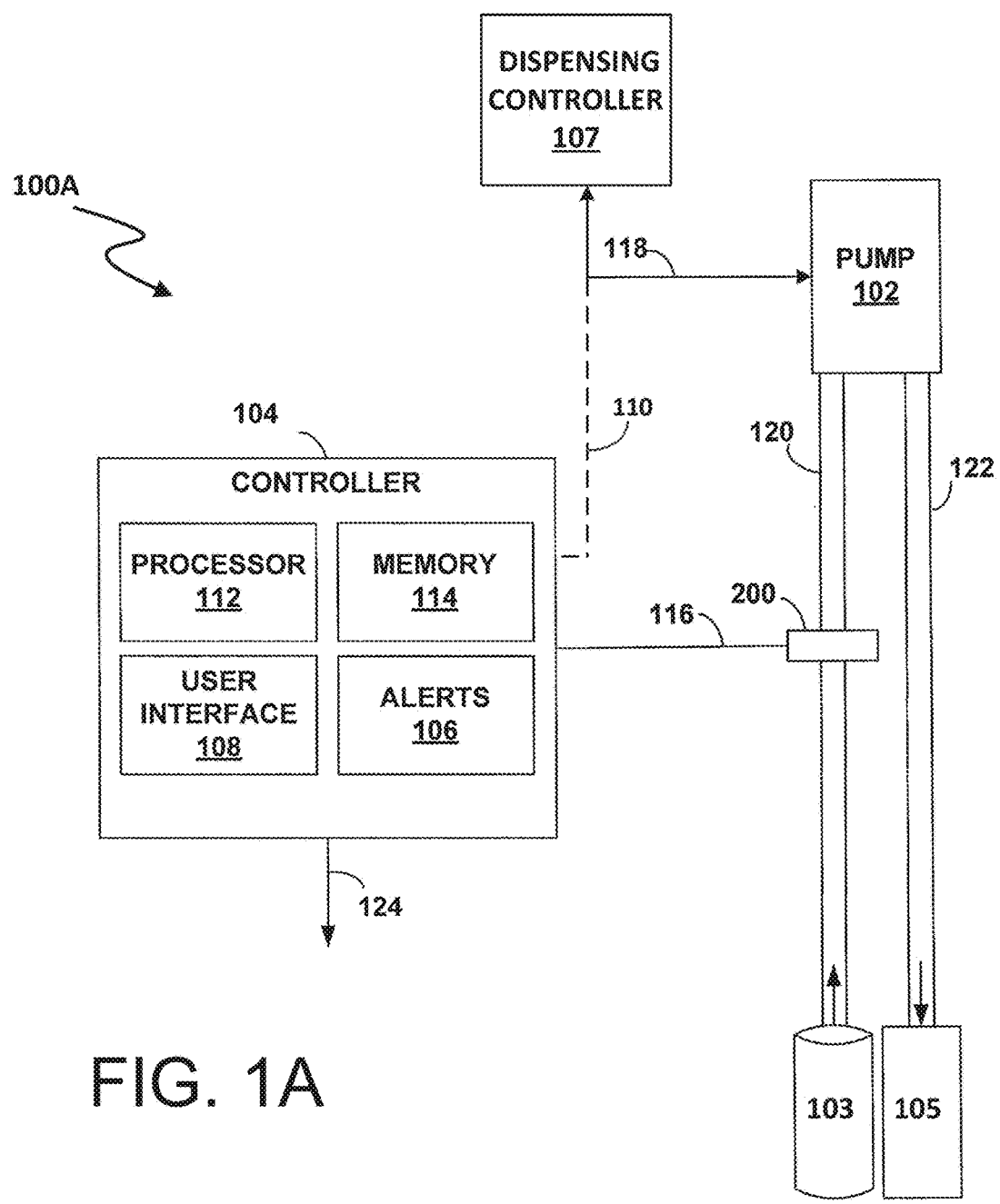
FIG. 1A is a diagram illustrating an example of an out-of-product system utilizing an optical sensor that detects presence and/or absence of a product to be dispensed.

FIG. 1A is a diagram illustrating an example out-of-product system 100A and an optical detection sensor assembly 200 that detects presence and/or absence of a product to be dispensed. Out-of-product system 100A includes system controller 104, dispensing controller 107, pump 102 and product reservoir 103. Pump 102 draws the product from reservoir 103 and delivers the product to dispensing site 105. Pump 102 draws product from product reservoir 103 through an input fluid delivery medium 120 and supplies fluid to dispensing site 105 via an output fluid delivery medium 122. Product reservoir 103 may contain any one of a multitude of different types of products having varying degrees of transparency and/or turbidity.

Dispensing controller 107 can communicate with pump 102 via connection 118. In some examples, pump 102 draws the product from reservoir 103 or stops pumping under the control of dispensing controller 107. In other examples, system controller 104 can communicate with dispensing controller 107 via connection 110. In those examples, dispensing controller 107 is under the control of system controller 104, and dispensing controller 107 directs pump 102 to draw product or stop pumping product from reservoir 103. In other examples, system controller 104 can communicate directly with pump 102 via a connection 110. Depending upon the application, system controller 104 or dispensing controller 107 may communicate with dispensing site 105 via another connection (not shown).

System controller 104 includes processor 112, user interface 108, memory 114 and alerts 106. In some examples, system 100A can include multiple system controllers 104. Signals generated by sensor assembly 200 can be communicated to system controller 104 via connection 116. Connection 116 may transmit a digital or analog signal. Connection 116 may include, for example, a standard I2C connection. However, any appropriate connection/communication channel known in the art may be used. System controller 104 can further include at least one external connection 124 such as an internet, telephone, wireless or other connection for achieving external communication.

Memory 114 stores software for running system controller 104 and also stores data that is generated or used by processor 112. Processor 112 runs software stored in memory 114 to manage operation of system controller 104. In one example, processor 112 can run an out-of-product timer. In another example, processor 112 can run a product present timer. In another example, processor 112 can simultaneously run an out-of-product timer and a product present timer. User interface 108 may be as simple as a few light emitting diodes (LEDs) and/or user actuatable buttons or may include a display, a keyboard or keypad, mouse or other appropriate mechanisms for communicating with a user.

Dispensing site 105 may be an end use location of the product or may be some other intermediate location. For example, when out-of-product system 100A is used in a commercial laundry or kitchen application, dispensing site 105 may be a washing machine or warewashing machine, in which case the product(s) may be dispensed into an on-unit dispense mechanism or directly into the wash environment. In that example, the product(s) dispensed may include laundry or dish detergent, fabric softener, bleach, sanitizer, rinse agent, etc. As another example, when fluid dispensing system is used in a hotel, business, industrial or other application in which service employees perform cleaning duties, dispensing site 105 may be a bucket, pail or other vessel into which the product(s) are dispensed. Dispensing site 105 may also be a hose or other tubing from which the fluid(s) is directed to a desired location. It shall be understood that out-of-product system 100A may be used in many different applications in which fluid is dispensed and that the disclosure is not limited in this respect. Examples of applications in which out-of-product system 100A may be used include laundry applications, dishwashing applications, commercial cleaning operations, food preparation and packaging applications, industrial processes, healthcare applications, vehicle care applications, and others known in the art.

Input fluid delivery medium 120 and output fluid delivery medium 122 may be implemented using any type of flexible or inflexible tubing, depending upon the application. This tubing may be transparent, translucent, braided or other type of tubing. The tubing may be made of polyethylene, ethylene-vinyl acetate, polytetrafluoroethylene, or any other suitable material. For simplicity and not by limitation, input fluid delivery medium 120 and output fluid delivery medium will be referred to herein as "input tubing 120" and "output tubing 122," respectively. Input tubing 120, output tubing 122 and pump 102 may be referred to herein as a "dispensing channel." Pump 102 may be any form of pumping mechanism that supplies fluid from product reservoir 103 to dispensing site 105. For example, pump 102 may comprise a peristaltic pump or other form of continuous pump, a positive-displacement pump or other type of pump appropriate for the particular application.

In the example system shown in FIG. 1A, sensor assembly 200 is positioned to detect presence and/or absence of product within input tubing 120. In operation, when fluid dispensing system attempts a dispensing cycle from a product reservoir 103 that has product remaining, input tubing 120 will likewise contain product. In some examples, sensor assembly 200 continuously sends signals to system controller 104, and system controller 104 interprets those signals to determine product presence or absence within input tubing 120. Over time, as operation continues and more and more product is dispensed, product reservoir 103 becomes substantially empty. Because product is no longer available to dispense, input tubing 120 will likewise become substantially empty. When system controller 104 determines that an out-of-product event has occurred based on the signals from sensor assembly 200, system controller 104 may generate an out-of-product alert.

For purposes of the present description, an "out-of-product event" is defined as an event in which system controller 104 detects an absence of fluid within input tubing 120. In some embodiments, the "out-of-product event" is determined with respect to one or more predefined out-of-product thresholds, such as a threshold time period. When system controller 104 detects an out-of-product event, system controller 104 may generate alerts 106, including a visual and/or audible out-of-product alert (such as text or graphics with without accompanying sound, etc.) displayed on user interface 108. Alternatively or in addition, system controller 104 may initiate and send an out-of-product message service call (such as via pager, e-mail, text message, etc.) to a technical service provider via external connection 124.

When an alert 106 is activated to indicate an out-of-product event, a user (such as an employee or service technician) may manually refill product reservoir 103. In this embodiment, the user may temporarily halt or shutdown operation of system 100A before refilling product reservoir 103. In one example, the user may do this by entering commands into dispensing controller 107 to stop operation of pump 102 and/or dispensing site 105. In another example, the user may do this by entering control commands via user interface 108 of system controller 104 to silence audible and/or visual alerts 106 for a period of time. In another example, the user may do this by entering control commands via user interface 108 of system controller 104 to stop operation of pump 102 and/or dispensing site 105. In another example, the user may manually shut off pump 102 and/or dispensing site 105. After the user has refilled product reservoir 103, the user may manually re-start pump 102 and/or dispensing site 105, may enter control commands into dispensing controller 107 to restart pump 102 and/or dispensing site 105, or may enter control commands via user interface 108 to cause system controller 104 to send control signals via connection 110 to re-start pump 102 and/or dispensing site 105. System controller 104 may further re-set, or clear, alerts 106 at the appropriate time (for example, after being manually cleared by a user, after product reservoir 103 has been refilled or system 100A is restarted).

In response to an out-of-product event, system controller 104 may automatically stop pump 102 and/or dispensing site 105 when an out-of-product event is detected, or system controller may send a signal to dispensing controller 107 to automatically stop pump 102 and/or dispensing site 105. In one example, system controller 104 may send control signals to pump 102 and/or dispensing site 105 across connections 110 to temporarily stop operation of the corresponding components without user intervention. System controller 104 may then re-start pump 102 and/or dispensing site 105 after receiving input from the user that product reservoir 103 has been re-filled. In another example, system controller may send control signals to dispensing controller 107 to temporarily stop pump 102 and/or dispensing site 105 without user intervention. System controller may then send signals to dispensing controller 107 to re-start pump 102 and/or dispensing site 105 after receiving input from the user that product reservoir 103 has been re-filled. In yet another example, only dispensing controller 107 is coupled to pump 102 and/or dispensing site 105, and system controller 104 does not communicate with dispensing controller 107, pump 102, or dispensing site 105. Alternatively, system controller 104 or dispensing controller 107 may initiate an automatic refill cycle after which the out-of-product alert would be cleared and the system started again.

Sensor assembly 200 or system controller 104 may also generate a visual indicator that indicates presence of fluid within input tubing 120. For example, a light of one color, such as green, may be used to indicate that product reservoir 103 has product remaining, while a light of another color, such as red or blinking, may be used to indicate that product reservoir 103 is empty and needs to be refilled.

Figure 1B:
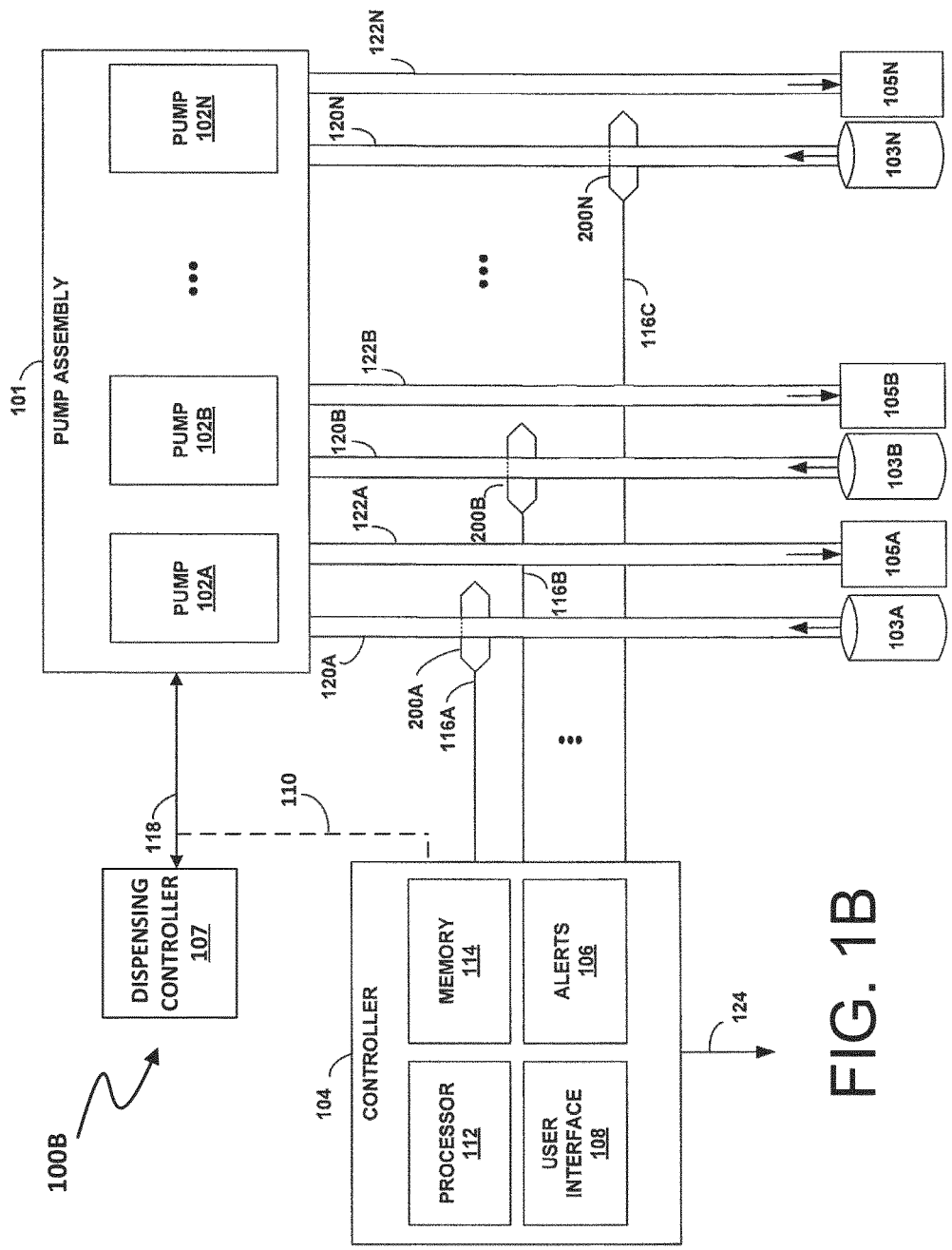
FIG. 1B is a diagram illustrating another example of an out-of-product system utilizing multiple optical sensors, each of which detects presence and/or absence of a different product to be dispensed.

FIG. 1B is a diagram illustrating another example out-of-product system 100B. Out-of-product system 100B dispenses multiple products. To that end, out-of-product system 100B includes multiple product channels (A-N), each having associated product reservoirs 103A-103N, pumps 102A-102N, system controller 104 and dispensing sites 105A-105N. Pumps 102A-102N are included in pump assembly 101. Pumps 102A-102N draw in fluid from a respective product reservoir 103A-103N through an input tubing 120A-120N, and supply fluid to one of dispensing sites 105A-105N through output tubing 122A-122N. Each product reservoir 103A-103N may contain any of a multitude of different types of products having varying transparency and/or turbidity. Optical detection sensor assemblies 200A-200N detect presence and/or absence of the product dispensed in the respective each dispensing channel.

Although the example out-of-product system 100B shown in FIG. 1B shows each dispensing channel as having its own dedicated product reservoir 103, input tubing 120, output tubing 122, pump 102, destination site 105 and sensor assembly 200, it shall be understood that there need not be a one to one correspondence for each dispensing channel. For example, sensor assemblies 200A-200N may be implemented in a single unit through which the input tubing for each dispensing channel is routed. Alternatively, various combinations of one channel per sensor or two or more channels per sensors may also be used and the disclosure is not limited in this respect.

Likewise, the example pump assembly 101 of FIG. 1B includes multiple pumps 102A-102N, one for each dispensed product. It shall be understood, however, that there need not be a one to one correspondence between pumps 102A-102N and the dispensing channels. For example, some dispensed products may share one or more pumps, which are switched from one dispensed product to another under control of system controller 104. The pump or pumps 102A-102N provide fluid to the appropriate dispensing site 105 from one of product reservoirs 103A-103B.

It shall also be understood that any of sensor assemblies 200A-200N may also be positioned to detect presence and/or absence of product within output tubing 122A-122N rather than input tubing 120A-120N as shown in FIG. 1B, and that the location of sensor assemblies 200A-200N may be more a matter of convenience than of system performance.

In some examples, system controller 104 can be coupled to dispensing controller 107 or pump assembly 101 via connection 110. Through connection 110, system controller 104 is able to communicate with pump assembly 101 and/or dispensing controller 107 to effectively control operation of each individual pump 102 (e.g., to temporarily stop or start operation, as described previously in reference to FIG. 1A). Depending upon the application, system controller 104 may also communicate with one or more dispensing sites 105A-105N. In other examples, only dispensing controller 107 is coupled to pump assembly 101 and dispensing controller 107 controls the function of pumps 102A-102N and/or dispensing sites 105A-105N.

Each sensor assembly 200A-200N detects presence and/or absence of fluid within the corresponding input tubing 120A-120N. System controller 104 is coupled to each sensor 206A-200N via a corresponding connection 116A-116N. System controller 104 monitors the signals received from each sensor assembly 200A-200N, and may respond as described above to any detected out-of-product events. For example, system controller 104 may generate a visual or audible alert 106 or display a message on user interface 108 if system controller detects one or more out-of-product events. The visual or audible alert 106 and/or message displayed on user interface 108 and/or message sent via pager, e-mail or text message, etc. would indicate which of product reservoirs 103A-103N is empty, thus informing a user which product reservoir needs to be filled. In some examples, system controller 104 may also automatically temporarily stop and then re-start the pump 102A-102N corresponding to the empty product reservoir 103A-103N and/or may initiate an automatic refill cycle of the empty product reservoir as described above. In other examples, pumps 102A-102N and/or dispensing sites 105A-105N may be stopped and re-started automatically or manually, with or without communication from system controller 104 and/or dispensing controller 107, as described with respect to FIG. 1A above.

Although in FIG. 1B each sensor assembly is shown with a dedicated connection to system controller 104, it shall be understood that sensor assemblies 200A-200N may be connected to communicate with system controller 104 in any of several different ways. For example, sensors 200A-200N may be connected to system controller 104 in a daisy-chain fashion. In this example, system controller 104 is coupled directly to a first sensor assembly 200A via connection 116A and each subsequent sensor assembly 200B-200N is coupled the next sensor assembly, etc. A communication protocol to identify and communicate separately with each sensor assembly 200A-200N may also be used. It shall be understood, however, that this disclosure is not limited with respect to the particular architecture by which sensor assemblies 200A-200N are connected with and communicate with system controller 104 and that the system may be set up in many different ways known to those of skill in the art.

Figure 2:
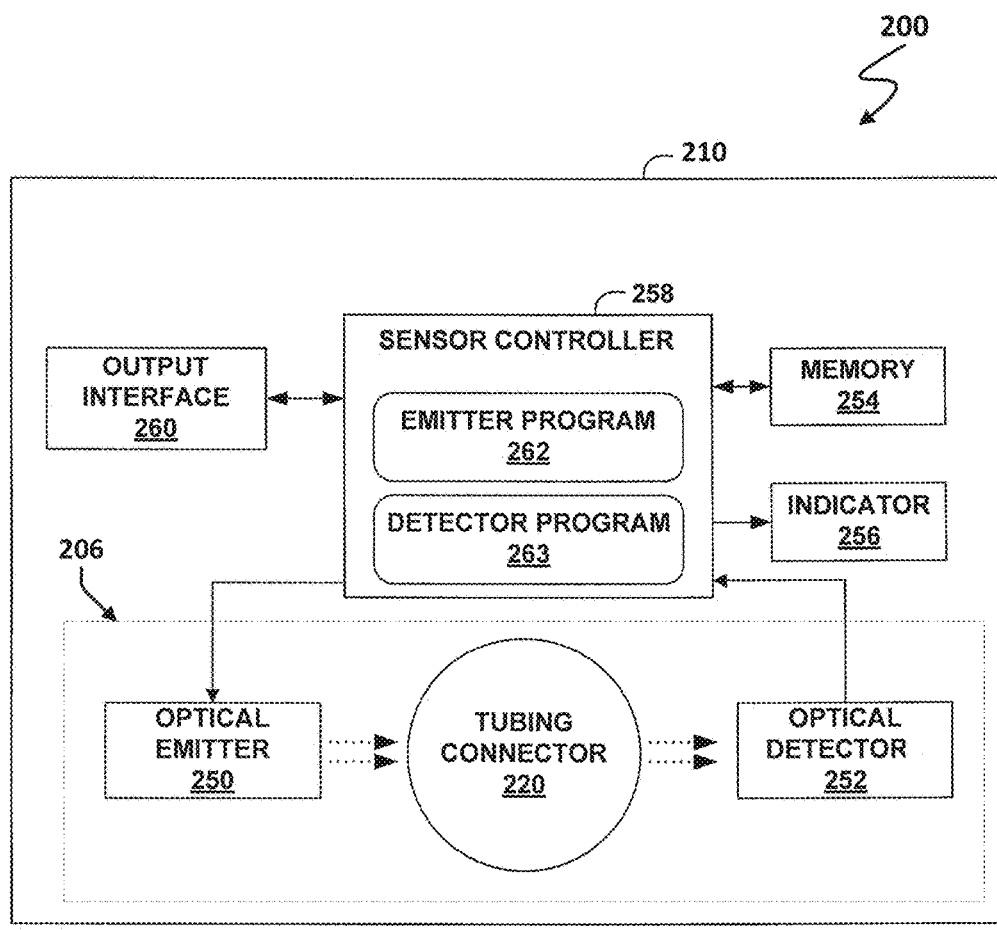
FIG. 2 is a block diagram illustrating an example of a sensor assembly that detects presence or absence of a product within a fluid delivery medium.

FIG. 2 is a block diagram illustrating an example embodiment of a sensor assembly 200 that detects presence and/or absence of a product to be dispensed. Sensor assembly 200 includes sensor 206, enclosure 210, sensor controller 258, memory 254, and output interface 260. Sensor 206 includes tubing connector 220, optical emitter 250, and optical detector 252. In one example, sensor 206 can be an OPTEK OPB350 optical sensor. Sensor assembly 200 may also include optional indicator 256. Sensor assembly 200 communicates with external devices, such as system controller 104 or other sensors via output interface 260.

Enclosure 210 contains all of the components of sensor assembly 200. In one example, enclosure 210 can be sealed from the external environment. Enclosure 210 protects the components of sensor assembly 200 from components of the external environment that could cause the sensor to malfunction, such as dust or liquid. In another example, enclosure 210 can be liquid tight. In other examples, enclosure 210 can be transparent so that the internal components, particularly indicator 256, of sensor assembly 200 are visible to the user.

Memory 254 stores software and data used or generated by sensor controller 258. As will be discussed in more detail below, memory may store baseline detection values produced by detector 252 and processed by sensor controller 258. During operation of sensor assembly 200, sensor controller 258 may control indicator 256 based upon information received from optical detector 252. For example, upon detection of an out-of-product state, sensor controller 258 may cause indicator 256 to generate a visual or audible alert. For purposes of this disclosure, "out-of-product state" is defined as a determination by sensor assembly 200 that sensor 206 has detected an absence of product in tubing 120 based on at least one detection value produced by detector 252. "Product present state" is defined as a determination by sensor assembly 200 that sensor 206 has detected present of product in tubing 120 based on at least one detection value produced by detector 252.

In one example, sensor controller 258 can send a binary signal via connector 260 to system controller 104 based on whether sensor 206 has detected a product present state or an out-of-product state. In another example, sensor controller 258 can send the raw output from detector 252 to system controller 104, which can process the raw output. In another example, sensor controller 258 can determine if an out-of-product event has occurred due to the presence of an out-of-product state for a predetermined time period, and sensor controller 258 can send an out-of-product message to an external device, such as system controller 104, via connector 260.

Optical emitter 250 includes at least one optical emitter that emits radiation having a specified wavelength range. Emitter 250 may emit light within a narrow-band of wavelengths or a relatively broader range of wavelengths. Emitter 250 may also emit light having varying wavelength over time. In one example, emitter 250 emits light within the visible spectrum. Light within the visible spectrum includes wavelengths in the range from 380 nm to 720 nm. One example of such an emitter is a light-emitting diode (LED). In another example, several individual LEDs placed in close proximity could also be used. Light emitted by emitter 250 propagates through tubing that runs through tubing connector 220 of sensor 206 and may be detected by one or more optical detectors 252. The amount of radiation detected by detectors 252 depends on the contents of the tubing running through tubing connector 220 and also on the type of tubing. If the tubing contains liquid product, detectors 252 will detect a certain level of radiation emitted from emitter 250.

However, if the tubing is substantially empty, detectors 252 may detect a different amount of radiation emitted from emitter 250.

Optical detectors 252 include at least one optical detector that detects radiation within associated wavelength ranges within the visible light spectrum. Detectors 252 may be implemented using multiple detectors, one for each wavelength range or may be implemented using a detector or detectors that are programmable to detect multiple wavelength ranges. The terms "detector" and "detectors" will therefore be used interchangeably herein.

Detector 252 detects radiation that is emitted by emitter 250 and that has propagated through tubing running through sensor 206 (via tubing connector 220). For example, detector 252 may include a photodetector that detects visible light within a single wavelength or in a wavelength ranges. It shall be understood, however, that detector 252 may include multiple detectors for detecting light in multiple wavelengths or wavelength ranges, and that the wavelength ranges chosen for both the emitter 250 and the detector 252 may depend upon the transparency and/or turbidity of the products to be detected by sensor 206.

Sensor controller 258 controls operation of emitter 250 and receives signals concerning the amount of light detected from detectors 252. Sensor controller 258 executes an emitter program 262 to control emitter 250, and executes detection program 263 to process signals received from detector 252. In one example, the signals received from detector 252 can be outputted as a voltage. In other examples, the signals received from detector 252 can be outputted as a current or a percentage of light transmittance. If detection program 263 detects an out-of-product state, it may activate indicator 256. In one embodiment, detection program 263 may also initiate indicator 256 if it confirms presence of fluid within the tubing.

In one example, sensor controller 258 initiates emitter program 262 and detection program 263 to create baseline detection data when product is present and/or when product is absent. When an external controller, such as system controller 104, is informed of a product present state or an out-of-product state within tubing 120, system controller 104 may send a baseline command to sensor assembly 200 (via connector 260) to cause generation of such baseline data. System controller 104 may be so informed, for example, via manual input from a user. When sensor controller 258 processes the baseline command, it will execute emitter program 262 to emit light and also execute detection program 263 to obtain baseline data from detector 252. Upon receipt of the baseline detection data from detector 252, controller 258 may store the baseline data within memory 254. If multiple detectors are used within detectors 252, signals for each detector may be stored in memory 254. Such baseline data may later be used for normalization purposes when attempting to determine absence and/or presence of fluid within the tubing.

Using the procedure describe above, sensor 206 can be calibrated prior to use in order to establish a baseline product presence state and a baseline empty state. In one example, sensor 206 can be calibrated with empty tubing to establish just a baseline empty state. This allows sensor 206 to be used with a variety of different products without having to recalibrate sensor 206 when switching from one product to another. In another example, sensor 206 can be calibrated with empty tubing to establish a baseline empty state and also calibrated with tubing full of product and free of any bubbles to establish a baseline product presence state. In another example, sensor 206 can be automatically calibrated when sensor 206 is first used. Based on the baseline empty state and/or the baseline product presence state, the user can choose a threshold out-of-product state. The out-of-product threshold is predetermined and stored in memory 254. In some examples, the out-of-product threshold may be determined empirically based upon experimental test data or upon expert knowledge that has been stored within memory 254. In other examples, the out-of-product threshold may be determine automatically based on the output of sensor 206 when sensor 206 is turned on for the first time with empty tubing.

Optical detector 252 detects the amount of emission radiated by emitter 250 propagated through tubing and the contents of the tubing. Controller 258 compares the amount of light received by detector 252 to the baseline data. Changes from the baseline data that satisfy a threshold may be caused by air present in the tubing, such as when product reservoir 103 is substantially empty and no product is available. Accordingly, some changes that satisfy a threshold may be indicative of an out-of-product state. However, not all changes from the baseline are due to an out-of-product state. For example, ambient lighting conditions, product and tubing variation, off-gassing of bubbles, small leaks in tubing, and batch-to-batch variation of a single product can all contribute to or create significant variation from the baseline which can trigger false positive out-of-product events. Some embodiments include additional features to avoid such instances.

In addition, in some embodiments, sensor controller 258 may scale the detection signal so that sensor-to-sensor variation can be eliminated. Often, the absolute output generated by one sensor unit may vary when compared to the absolute output generated by a second sensor unit even when testing an identical substance under identical conditions. Thus, as used in this application, the term "detector output" should be interpreted to include both raw detection signals, and scaled detector output.

Sensor controller 258 processes the detector output received from detector 252. Detection program 263 compares a detector outputs with at least one out-of-product threshold to determine a product present state or an out-of-product state within tubing 120. In some embodiments, sensor controller 258 accounts for false positive and false negatives in order to obtain a more accurate determination of a product present state or an out-of-product state. For example, off-gassing of bubbles from priming pump 102 or a small leak in tubing 120 could falsely indicate an out-of-product state. Sensor controller 258 can account for such situations by determining whether the output from detector 252 satisfies an out-of-product threshold for at least a predetermined filter time.

In some examples, the filter time can be between 50 milliseconds and 150 milliseconds. In other examples, the filter time can be 100 milliseconds. If sensor controller 258 determines that an out-of-product threshold is satisfied for the predetermined filter time, sensor controller 258 determines an out-of-product state. If a bubble is present for only a few milliseconds, the out-of-product threshold will not be satisfied for the predetermined filter time, and sensor controller 258 will determine a product present state. Sensor controller 258 can similarly account for situations where product coats or films the inside of tubing 120 and falsely indicates a product present state. Sensor assembly 200 will recognize coating or filming as a large bubble and correctly determine an out-of-product state.

In some examples, sensor controller 258 sends signals via output interface 260 to system controller 104 indicating out-of-product states and product present states. System controller 104 processes these signals to determine whether an out-of-product event has occurred that requires an out-of-product alarm to be triggered. In other examples, sensor controller 258 itself determines whether an out-of-product event has occurred and sends an out-of-product event signal to system controller 104 indicating that an out-of-product alarm should be triggered. An out-of-product event is determined when an out-of-product state is present for a predetermined out-of-product threshold time period, as described in further detail below in FIGS. 3A-3D.

Figure 3A:
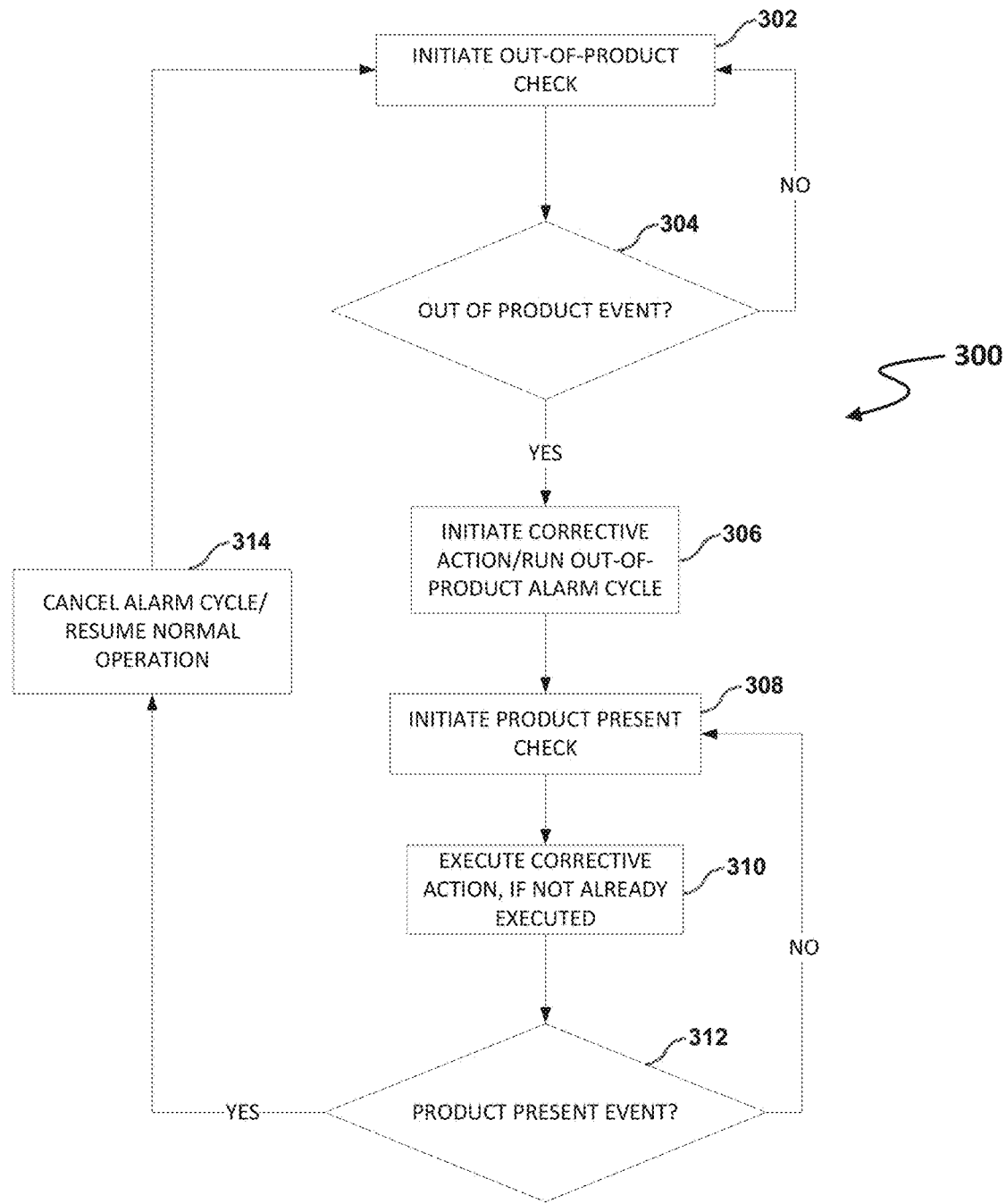
FIG. 3A is a flow diagram illustrating an example out-of-product alarm process.

FIG. 3A is a flow diagram illustrating an example out-of-product alarm process (300). The process (300) starts by initiating an out-of-product check (302), which may include sending a signal from sensor assembly 200 to system controller 104. In one example, to perform an out-of-product event check (304), sensor assembly 200 scans fluid delivery medium 120 and sends signals to system controller 104 indicating product present states or product absence states. System controller 104 processes the signals from sensor assembly 200 to determine whether or not an out-of-product event has occurred. In another example, sensor assembly 200 determines whether an out-of-product event has occurred and sends an out-of-product event signal to system controller 104. This procedure is described in further detail in relation to FIG. 3B below.

If an out-of-product event is not detected (304), then the process (300) starts over by initiating an out-of-product check again (302). If an out-of-product event is detected, a corrective action is initiated and/or an out-of-product alarm cycle is run (306). The alarm cycle may include a visual alarm on sensor assembly 200 and/or system controller 104, as well as a sound alarm generated by system controller 104. In one example, the visual alarm may be a flashing red LED on sensor assembly 200 and/or a flashing red LED on system controller 104. The alarm cycle is described in further detail in relation to FIG. 3D below.

In some examples, initiating a corrective action (306) includes only running an alarm cycle. In these examples, a visual and/or audible alarm alerts a user to take corrective action and pump 102 and equipment at dispensing site 105 continue running without product. In other examples, independently from or in addition to running an alarm cycle, initiating a corrective action (306) may include sending a signal from system controller 104 or dispensing controller 107 to pump 102 and/or dispensing site 105 in order to initiate shut off of pump 102 and/or dispensing site 105. In other examples, independently from or in addition to running an alarm cycle, initiating a corrective action (306) may include sending a signal to a user through external connection 124 to inform the user that a corrective action needs to be taken.

In response to the alarm cycle and/or initiation of a corrective action (306), a corrective action is taken (310). In some examples, a user may manually shut off pump 102 and/or dispensing site 105, and replace or refill product reservoir 103. In other examples, pump 102 and/or equipment at dispensing site 105 may be automatically shut off in response to a signal from system controller 104, and a user may subsequently replace or refill product reservoir 103. In other examples, product reservoir 103 may be replaced or refilled automatically.

In one example, simultaneously with or after initiating a corrective action (306), system controller 104 sends a signal to sensor assembly 200 to initiate a product present check (308). In another example, sensor assembly 200 initiates a product present check (308) itself. The product present check (312) determines if a corrective action has been taken such that product is again present in fluid delivery medium 120.

In one example, to perform a product present event check (312), sensor assembly 200 scans fluid delivery medium 120 and sends signals to system controller 104 indicating product present states or product absence states. System controller 104 processes the signals from sensor assembly 200 to determine whether or not determine whether or not a product present event has occurred. In another example, sensor assembly 200 determines whether a product present event has occurred, and sends a product present event signal to system controller 104. This procedure is described in further detail in relation to FIG. 3C below. If a product present event is not detected, the product present check is initiated again (308). If a product present event is detected, the alarm cycle is cancelled and normal operation is resumed (314).

In some examples, canceling the alarm cycle (314) includes sending a signal with system controller 104 to turn off a visual alarm on sensor assembly 200 and/or system controller 104, and/or sending a signal to turn off an audible alarm on system controller 104. In other examples, canceling the alarm cycle (314) includes manually turning off a visual alarm on sensor assembly 200 and/or system controller 104, and/or manually turning off an audible alarm on system controller 104. In some examples, resuming normal operation (314) includes sending a signal to pump 102 and/or dispensing site 105 to turn on pump 102 and/or equipment at dispensing site 105. In other examples, resuming normal operation (314) includes manually turning on pump 102 and/or equipment at dispensing site 105. In other examples, when pump 102 and/or equipment at dispensing site 105 are not shut off in response to an out-of-product alarm, normal operation is resumed once product reservoir 103 has been refilled or replaced. Once normal operation is resumed (314), the process (300) starts over by initiating an out-of-product check (302).

Figure 3B:
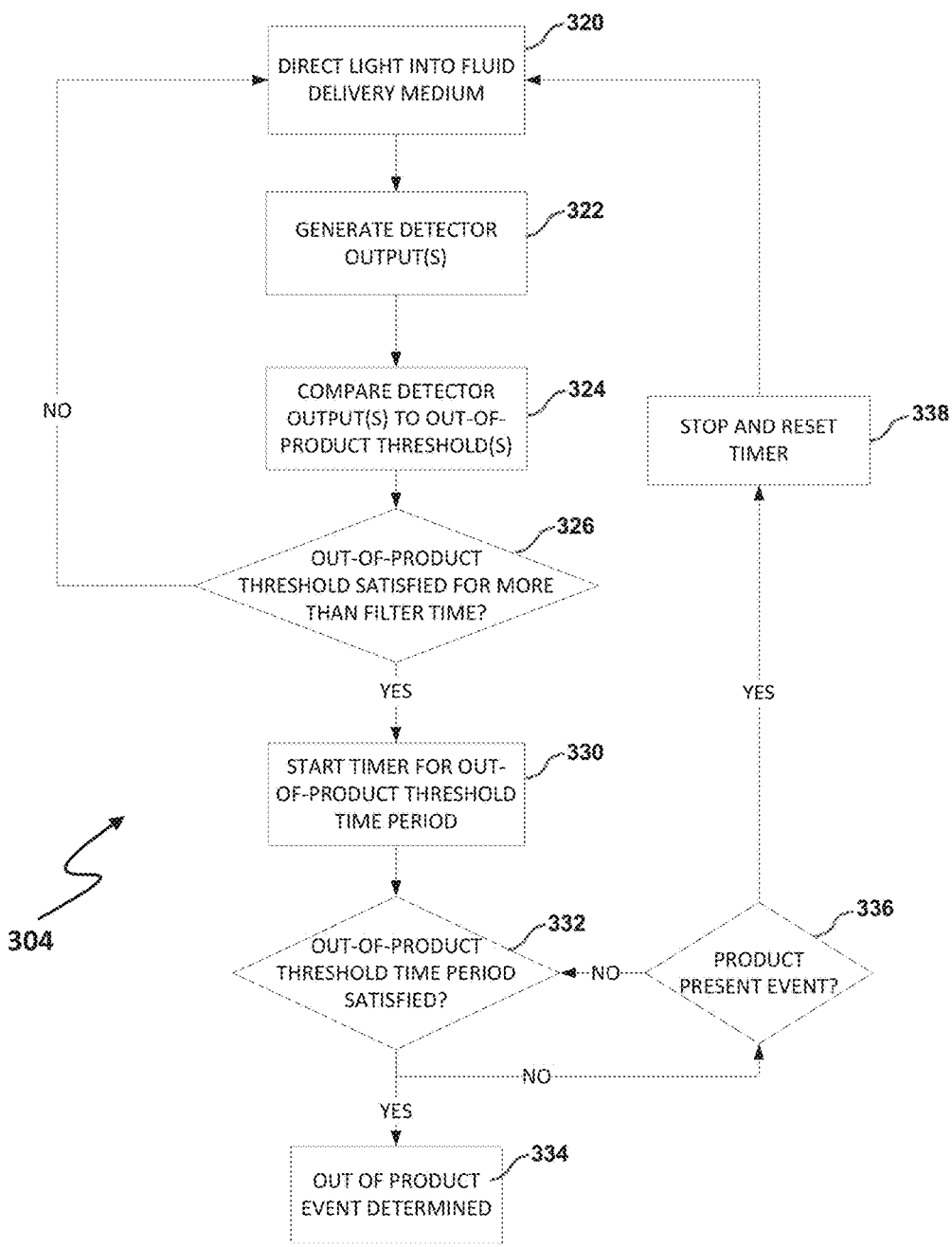
FIG. 3B is a flow diagram illustrating an example out-of-product event determination process employed in the out-of-product alarm process of FIG. 3A.

FIG. 3B is a flow diagram illustrating an example out-of-product event determination process (304) employed in the out-of-product alarm process (300) of FIG. 3A. The out-of-product event determination process (304) is a process by which sensor assembly 200 and/or system controller 104 detects absence of a product within fluid delivery medium 120 for an out-of-product threshold time period. Emitter 250 directs light into fluid delivery medium 120 in which presence of product is to be determined (320). As described above, emitter 250 may include, for example, an LED that emits light in the visible wavelength range.

Detector 252 generates a detector output (322) based upon detection of light transmitted through fluid delivery medium 120. For example, detector 252 may include a detector that generates a detector output corresponding to emitted light within a wavelength range transmitted through fluid delivery medium 120. Detectors 252 may also include additional detectors that generate detector outputs based on an amount of light received in additional wavelength ranges. In one example, the signals received from detector 252 can be outputted as a voltage. In other examples, the signals received from detector 252 can be outputted as a current or a percentage of light transmittance.

Sensor controller 258 executes detection program 263 to compare the detector output with at least one corresponding out-of-product threshold to determine absence of product within the fluid delivery medium (324). In one example, in order to satisfy the out-of-product threshold, a bubble must be present in fluid delivery medium 120. In another example, in order to satisfy the out-of-product threshold, a bubble must be present in fluid delivery medium 120 for more than a predetermined filter time (described above with respect to FIG. 2). If the detector output satisfies its corresponding out-of-product threshold(s) (326), an out-of-product timer is started. In one example, system controller 104 receives a signal from sensor controller 258 indicating that an out-of-product state exists in fluid delivery medium 120, and system controller 104 starts an out-of-product timer. In another example, sensor controller 258 starts the out-of-product timer after determining an out-of-product state exists.

In one example, once the out-of-product timer is started, system controller 104 simultaneously checks for a product present event (described in FIG. 3C below) and checks to see if the out-of-product threshold time period has been satisfied. In another example, sensor assembly 200 performs the simultaneous checks. In determining whether the out-of-product threshold time period has been satisfied, sensor assembly 200 continues to direct light into fluid delivery medium 120 (320), generate a detector output (322), and compare the detector output to a corresponding out-of-product threshold (326). In one example, detector 252 of sensor 206 generates a detector output every 10 milliseconds.

If the detector output continuously satisfies its corresponding out-of-product threshold for the threshold out-of-product time period (332), an out-of-product event is determined (334). In one example, system controller 104 determines an out-of-product event and sends a signal to initiate a corrective action (306). In another example, external connector 260 of sensor assembly 200 sends an out-of-product signal to system controller 104 to trigger the alarm cycle and initiate corrective action (306). In one example, the threshold out-of-product time period is thirty seconds. In other example, the threshold out-of-product time period may be between fifteen seconds and forty-five seconds. In another embodiment, the threshold out-of-product time period may be between twenty-five seconds and thirty-five seconds. In another example, the user may set the threshold out-of-product time period by entering control commands via user interface 108 of system controller 104. In one example, in order to "continuously" satisfy the out-of-product threshold, the detector output must satisfy the out-of-product threshold at least once every 100 milliseconds or once every ten scans from sensor 206. In another example, if a product present event occurs (336) after the out-of-product timer is started, the timer is stopped and reset (338), and sensor assembly 200 continues to scan fluid delivery medium 120 for an out-of-product state.

Typical out-of-product alarm systems trigger an out-of-product alarm upon the detection of a single bubble in a fluid delivery medium. The out-of-product determination process (304) of this disclosure is advantageous, because it prevents false out-of-product alarms. As described above, system controller 104 or sensor assembly 200 can be programmed with an appropriate threshold out-of-product time period. The threshold out-of-product time period can be based on the properties of the fluid delivered through fluid delivery medium 120. Some fluids produce bubbles as they travel through a fluid delivery medium, but unless the bubbles are continuous, they are not an indication of absence of product in the fluid delivery medium. The out-of-product event determination process (304) of this disclosure accounts for such fluids, as requiring sensor assembly 200 to detect absence of product for a threshold out-of-product time period prevents system controller 104 from triggering a false alarm and shutting off pump 102 and/or dispensing site 105.

The out-of-product event determination process (304) also allows for early detection of an out-of-product event by requiring a product present event to occur in order to shut off the out-of-product timer.

Figure 3C:
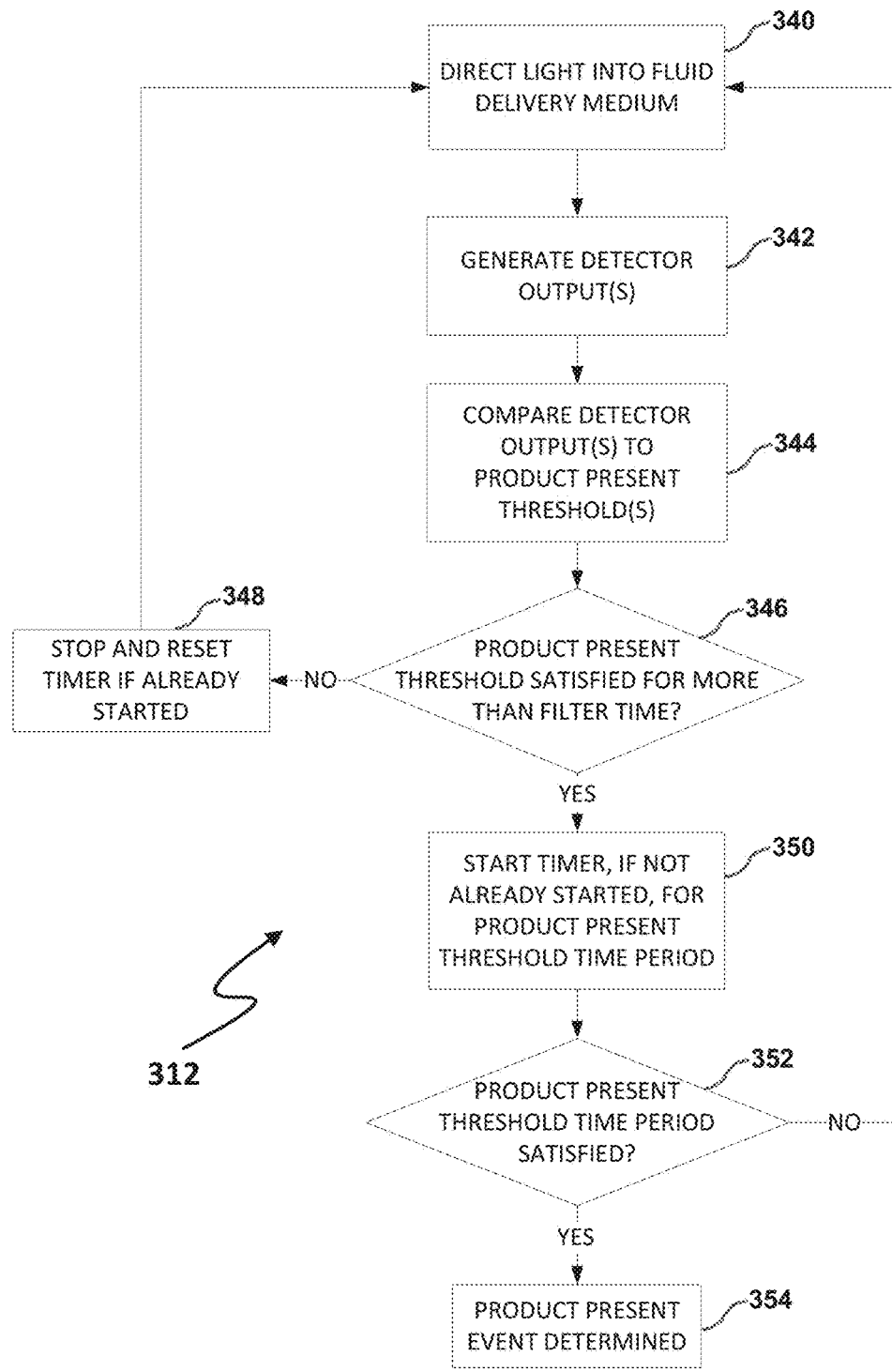
FIG. 3C is a flow diagram illustrating an example product present event determination process which is employed in the out-of-product alarm process of FIG. 3A.

FIG. 3C is a flow diagram illustrating an example product present event determination process (312) employed in the out-of-product alarm process (300) of FIG. 3A. The product present determination event process (312) is process by which sensor assembly 200 and/or system controller 104 detects presence of a product within fluid delivery medium 120. The product present determination process (312) is substantially similar to the out-of-product event determination process (304) of FIG. 3B. Emitter 250 directs light into fluid delivery medium 120 in which presence of product is to be determined (340).

Detector 252 generates a detector output (342) based upon detection of light transmitted through fluid delivery medium 120. Sensor controller 258 executes detection program 263 to compare the detector output with at least one corresponding product present threshold to determine presence of product within the fluid delivery medium (344). In one example, in order to satisfy the product present threshold, fluid delivery medium cannot contain a bubble larger than one inch. In another example, in order to satisfy the product present threshold, a bubble cannot be present in the fluid delivery medium for longer than a predetermined filter time (described above with respect to FIG. 2).

If the detector output satisfies its corresponding product present threshold(s) (346), a product present timer is started. In one example, system controller 104 receives a signal from sensor controller 258 indicating that a product present state exists in fluid delivery medium 120, and system controller 104 starts a product present timer. In another example, sensor controller 258 starts the product present timer after determining a product present state. Once the product present timer is started, sensor assembly 200 continues to direct light into fluid delivery medium 120 (340), generate a detector output (342), and compare the detector output to a corresponding product present threshold (346). In one example, detector 252 of sensor 206 generates a detector output every 10 milliseconds.

If the detector output continuously satisfies its corresponding product present threshold for a threshold product present time period (352), a product present event is determined (354). In one example, system controller 104 determines a product present event and send a signal to trigger cancelation of the alarm cycle and resume normal operation (314). In another example, external connector 260 of sensor assembly 200 sends a signal to system controller 104 to trigger cancelation of the alarm cycle and resume normal operation (314). In one example, the threshold product present time period is three seconds. In other embodiments, the threshold product present time period may be between ten milliseconds and five seconds. In another embodiment, the threshold product present time period may be between two seconds and four seconds. In another example, the user may set the threshold product present time period by entering control commands via user interface 108 of system controller 104. In one example, in order to "continuously" satisfy the product present threshold, the detector output must satisfy the product present threshold at least once every 100 milliseconds or once every ten scans from sensor 206. If the detector output does not satisfy the product present threshold or if the product present threshold time period is not satisfied, the timer is reset and sensor assembly 200 continues to scan fluid delivery medium 120 for a product present state.

The product present event determination process (312) of this disclosure is advantageous, because it allows for early detection of an out-of-product event. By setting a product present threshold time period, an out-of-product event can be determined when there are bubbles present more frequently than the product present threshold time period. For example, if the product present threshold time period is three seconds and bubbles are present every two seconds, an out-of-product event can still be determined even though bubbles are not continuously present. This is advantageous because it can prevent the dispensing system from running with less than the desired amount of product.

Figure 3D:
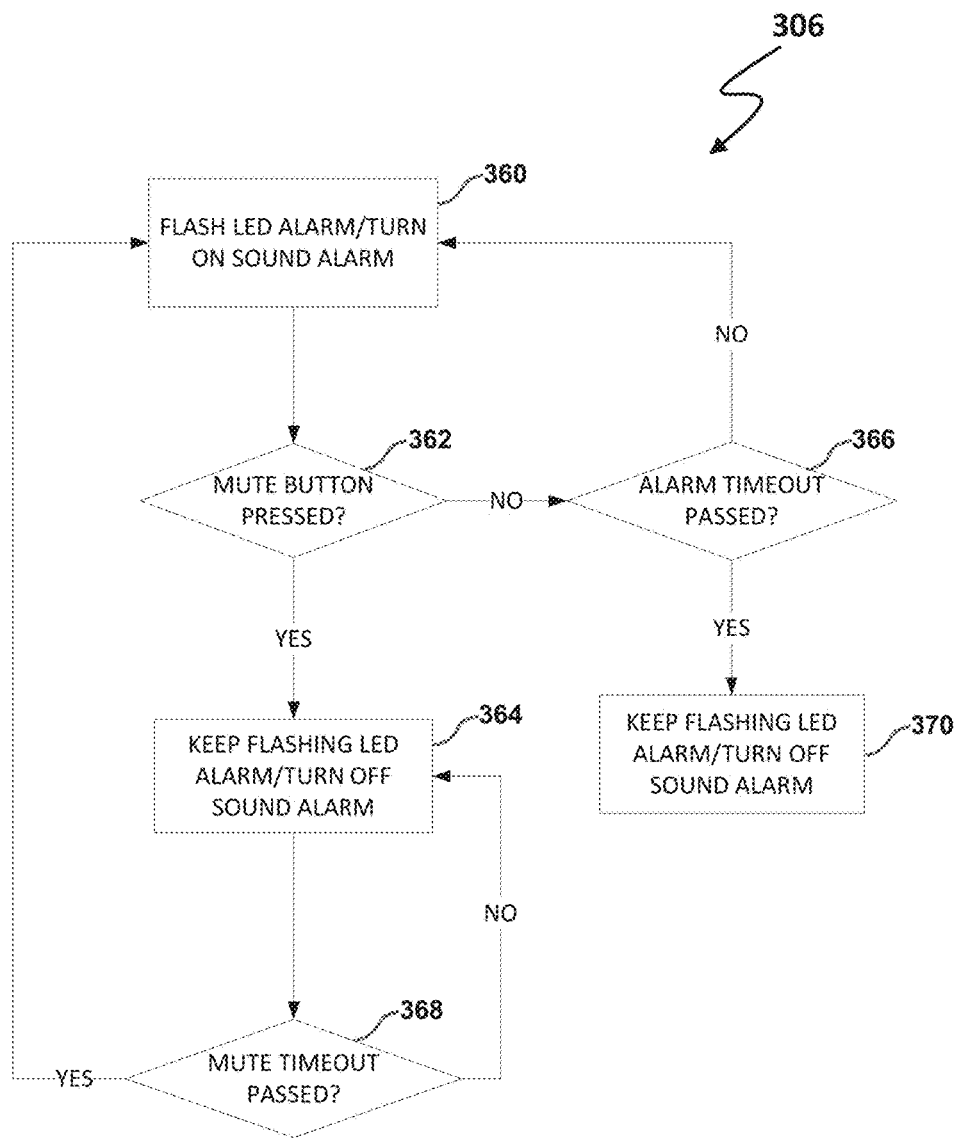
FIG. 3D is a flow diagram illustrating an example out-of-product alarm cycle, which is employed in the out-of-product alarm process of FIG. 3A.

FIG. 3D is a flow diagram illustrating an example out-of-product alarm cycle (306) employed in the out-of-product alarm process (300) of FIG. 3A. Once an out-of-product state is determined (304) in the out-of-product alarm process (300), a visual alarm and/or a sound alarm can be turned on (360). In one example, the visual alarm may be a red LED on system controller 104 and/or on sensor 206, and the sound alarm may be generated by system controller 104. In some examples, a mute button is available on system controller 104, and a user can press the mute button to turn off the sound alarm once it has been initiated.

Once the alarm has been turned on, if a mute button is available on system controller 104, system controller 104 checks to see if the mute button is pressed (362). If system controller 104 determines that the mute button has been pressed, system controller 104 turns off the sound alarm, and the LED alarm(s) on system controller 104 and/or sensor assembly 200 continue to flash (364). In some examples, system controller 104 can be programmed to turn the sound alarm back on after a mute timeout period. In those examples, system controller 104 checks to see if the mute timeout period has passed (368). In some examples, the mute timeout period is between fifteen minutes and two hours. In other example, the mute timeout period is between forty-five minutes and one and a half hours. In another example, the mute timeout period is one hour. If the mute timeout period has passed, system controller 104 turns the sound alarm back on and the LED alarm(s) on system controller 104 and/or sensor assembly 200 continue to flash (360). In another example, the user may set the mute timeout period by entering control commands via user interface 108 of system controller 104. If the mute timeout period has not passed, system controller 104 turns off the sound alarm if it is not already off, and the LED alarm(s) on system controller 104 and/or sensor assembly 200 continue to flash (364). In other examples, if the mute button is pressed, both the sound and visual alarms can be turned off.

In some examples, system controller 104 can be programmed to turn off the sound alarm after an alarm timeout period. In those examples, system controller 104 checks to see if the alarm timeout period has passed (366). In some examples, the alarm timeout period is between fifteen minutes and two hours. In other example, the alarm timeout period is between forty-five minutes and one and a half hours. In another example, the alarm timeout period is one hour. In another example, the user may set the alarm timeout period by entering control commands via user interface 108 of system controller 104. If the alarm timeout period has passed, system controller 104 turns the sound alarm off and the LED alarm(s) on system controller 104 and/or sensor assembly 200 continue to flash (370). If the alarm timeout period has not passed, system controller 104 turns on the sound alarm if it is not already on, and the LED alarm(s) on system controller 104 and/or sensor assembly 200 continue to flash (364). In other examples, if the alarm timeout period has passed, both the sound and visual alarms can be turned off.

Figure 4A:
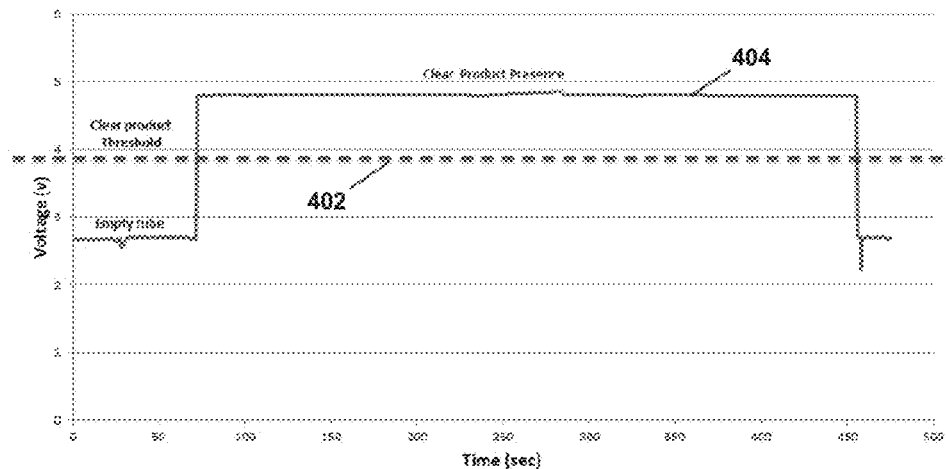
FIGS. 4A-4B are graphs illustrating examples of detector outputs indicating product presence of clear and opaque products.
Figure 4B:
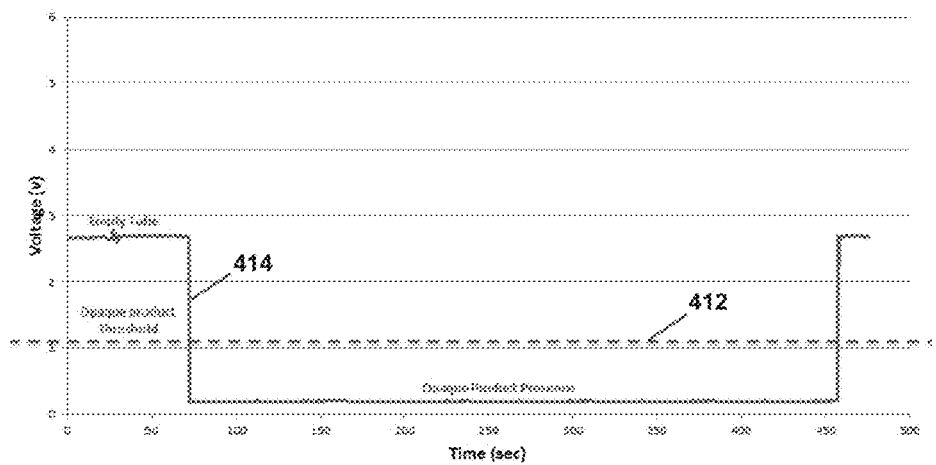

FIGS. 4A-4B are graphs illustrating examples of detector outputs indicating product presence of clear and opaque products. As described above, sensor 206 can be calibrated prior to use in order to establish a baseline product presence state and a baseline empty state. Sensor 206 can be calibrated with empty tubing to establish a baseline empty state and also calibrated with tubing full of product and free of any bubbles to establish a baseline product presence state. Based on the baseline empty state and the baseline product presence state, the user can choose a threshold out-of-product state.

FIGS. 4A-4B show output signals of sensor 206 in voltage versus time. FIG. 4A includes clear product threshold 402 and output voltage 404. Output voltage 404 shows a baseline empty tube state, as well as a baseline product presence state. As described above, clear product threshold 402 may be selected by a user and stored in memory 254 of sensor assembly 200. With clear product threshold 402 established, when output voltage 404 is above clear product threshold 402, sensor assembly 200 determines that product is present in fluid delivery medium 120. Likewise, when output voltage 404 is below clear product threshold 402, sensor assembly 200 determines that product is absent from fluid delivery medium 120 and/or fluid delivery medium 120 is an empty tube.

FIG. 4B includes opaque product threshold 412 and output voltage 414. Output voltage 414 shows a baseline empty tube state, as well as a baseline product presence state. As described above, clear product threshold 412 may be selected by a user and stored in memory 254 of sensor assembly 200. With opaque product threshold established, when output voltage 414 is below opaque product threshold 412, sensor assembly 200 determines that product is present in fluid delivery medium 120. Likewise, when output voltage 414 is above opaque product threshold 412, sensor assembly 200 determines that product is absent from fluid delivery medium 120 and/or fluid delivery medium 120 is an empty tube.

Figure 5A:
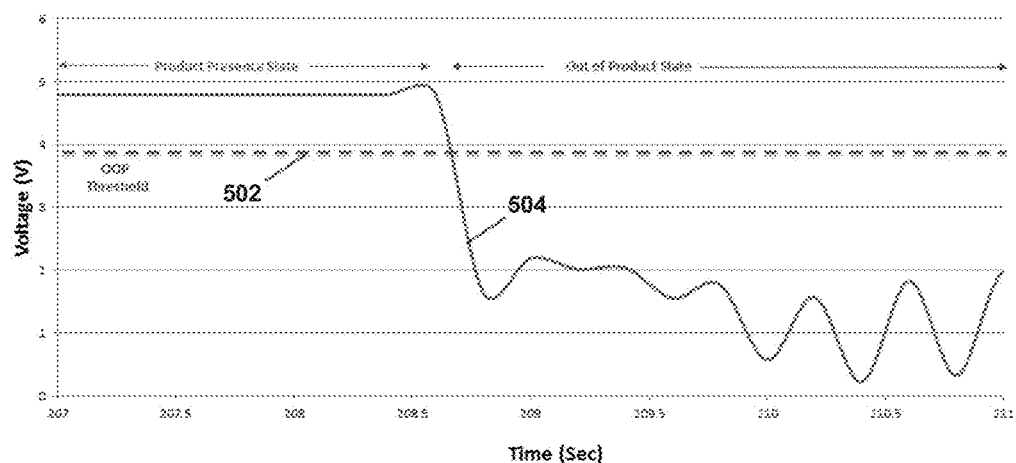
FIGS. 5A-5B are graphs illustrating examples of detector outputs indicating product absence, including an out-of-product event that triggers an out-of-product alarm.
Figure 5B:
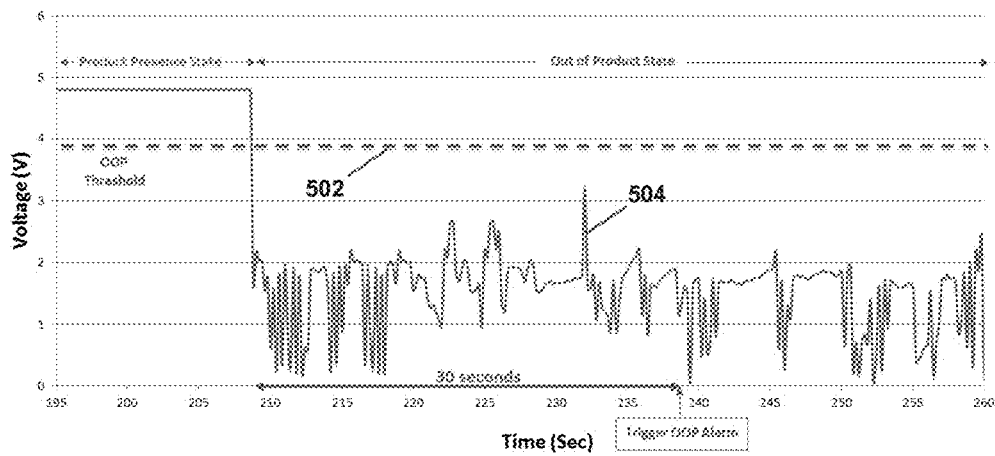

FIGS. 5A-5B are graphs illustrating examples of detector outputs indicating product absence, including an out-of-product event that triggers an out-of-product alarm. FIGS. 5A-5B show output signals of sensor 206 in voltage versus time. FIGS. 5A-5B include out-of-product threshold 502 and output voltage 504. In FIGS. 5A-5B, output voltage 504 shows a baseline product present state, as well as detector outputs which satisfy out-of-product threshold 502. As described above, out-of-product threshold 502 may be selected by a user and stored in memory 254 of sensor assembly 200.

As shown in FIGS. 5A-5B, when output voltage 504 is above out-of-product threshold 502, sensor assembly 200 determines a product present state in fluid delivery medium 120. Likewise, when output voltage 504 is below out-of-product threshold 502, sensor assembly 200 determines an out-of-product state in fluid delivery medium 120. As described above in reference to FIGS. 3A-3D, when the detector output satisfies the out-of-product threshold, an out-of-product timer is started either by system controller 104 or sensor controller 258. As shown in FIG. 5B, if output voltage 404 is continuously below out-of-product threshold 502 for a threshold out-of-product time period, an out-of-product event occurs and an out-of-product alarm is triggered. This could occur, for example, due to a near-out-of-product state in which a mixture of liquid and air would be drawn into the fluid delivery medium from the product reservoir until the level of liquid in the product reservoir drops low enough that substantially only air is drawn into the fluid delivery medium. In FIG. 5B, the threshold out-of-product time period is thirty seconds. As described above, the threshold out-of-product time period can be selected, for example, based on the fluid properties of the product.

Figure 5C:
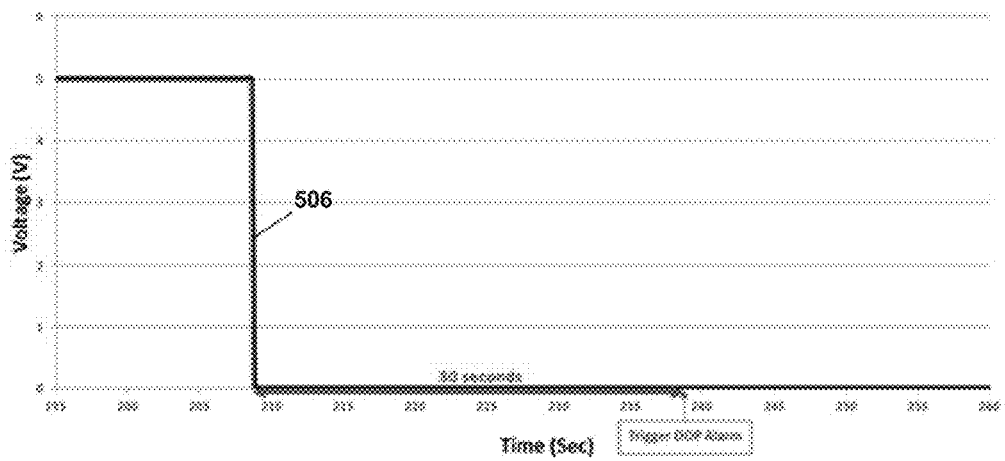
FIG. 5C is a graph illustrating an example of a binary digital output based on the detector output in FIG. 5B, including an out-of-product event that triggers an out-of-product alarm.

FIG. 5C is a graph illustrating an example of binary digital output 506 based on the detector output in FIG. 5B. In some examples, system controller 104 receives the detector signal from sensor assembly 200 as a binary output or receives the detector signal and converts the signal to a binary output, where a voltage of 5 indicates a product present state and a voltage of 0 indicates an out-of-product state. If an out-of-product state is present for a threshold out-of-product time period, system controller 104 determines that an out-of-product event has occurred and an out-of-product alarm is triggered. In another example, sensor controller 258 can convert the detector signal to a binary output and upon determination of an out-of-product event, sends a signal to system controller 104 to trigger an out-of-product alarm.

Figure 6A:
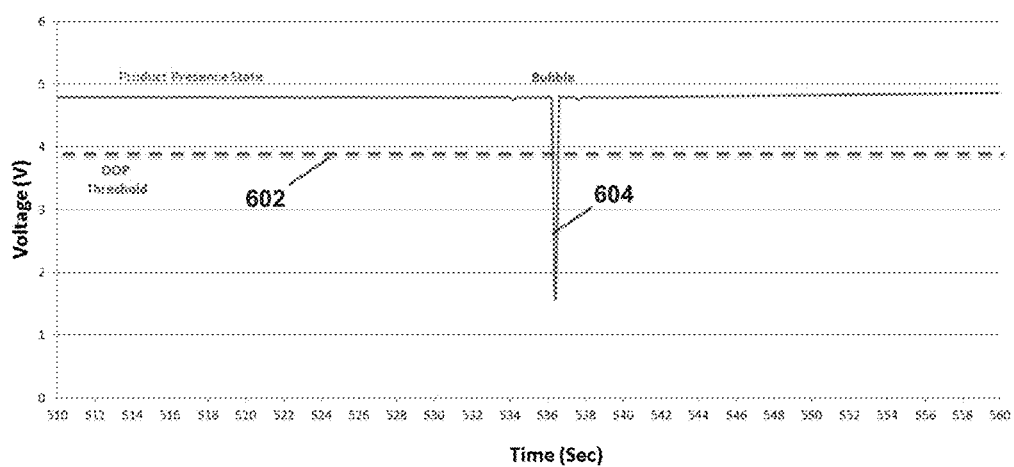
FIGS. 6A-6B are graphs illustrating examples of detector outputs indicating the presence of bubbles in a fluid delivery medium, where the bubbles are insufficient to trigger an out-of-product alarm.
Figure 6B:
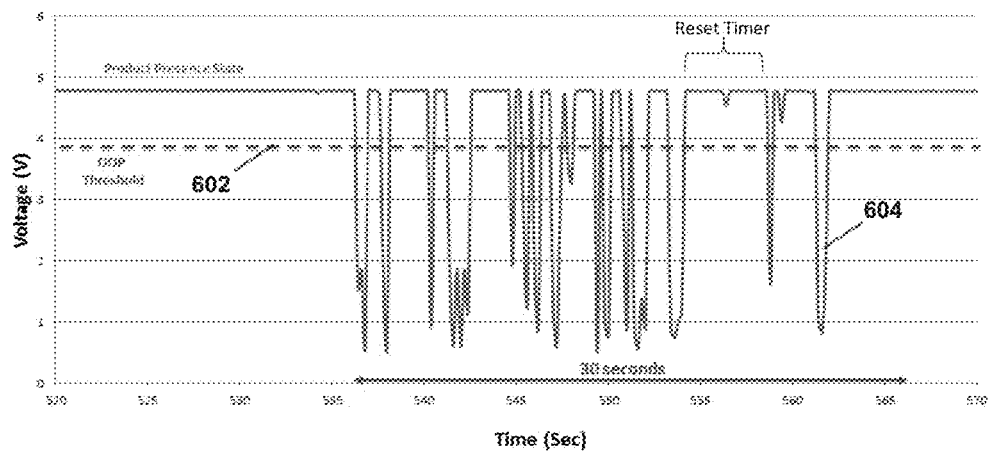

FIGS. 6A-6B are graphs illustrating examples of detector outputs indicating the presence of bubbles in a fluid delivery medium, where the bubbles are insufficient to trigger an out-of-product alarm. FIGS. 6A-6B show output signals of sensor 206 in voltage versus time. FIGS. 6A-6B include out-of-product threshold 602 and output voltage 604. In FIGS. 6A-6B, output voltage 604 shows a baseline product present state, as well as detector outputs which satisfy out-of-product threshold 602. As described above, out-of-product threshold 602 may be selected by a user and stored in memory 254 of sensor assembly 200. As shown in FIGS. 6A-6B, when output voltage 604 is above out-of-product threshold 602, sensor assembly 200 determines a product present state in fluid delivery medium 120. Likewise, when output voltage 604 is below out-of-product threshold 602, sensor assembly 200 determines an out-of-product state in fluid delivery medium 120.

As described above in reference to FIGS. 3A-3D, when the detector output satisfies the out-of-product threshold, a timer is started either by system controller 104 or sensor controller 258. In some examples, as shown in FIG. 6A, a single bubble is not enough to trigger the timer. In these examples, sensor assembly 200 may determine that the single bubble does not meet a threshold filter time to indicate an out-of-product state sufficient to trigger the timer. As described above, a single bubble could occur, for example, due to off-gassing of a bubble from the product or due to a small leak in the fluid delivery medium. Once the timer is triggered, in order for system controller 104 or sensor controller 258 to determine an out-of-product event, however, the detector output must be continuously below out-of-product threshold 602 for a threshold out-of-product time period. As shown in FIG. 6B, if system controller 104 or sensor controller 258 detects product presence for a threshold product present time period while the out-of-product timer is running, the out-of-product timer will be reset. This could occur, for example, if the product reservoir is low on product but not at an out-of-product state or a near-our-of-product state. In the example shown in FIG. 6B, after the out-of-product timer is triggered, when product presence is detected for at least three seconds, the out-of-product timer resets. As described above, the threshold product present time period can be selected, for example, based on the fluid properties of the product.

Figure 6C:
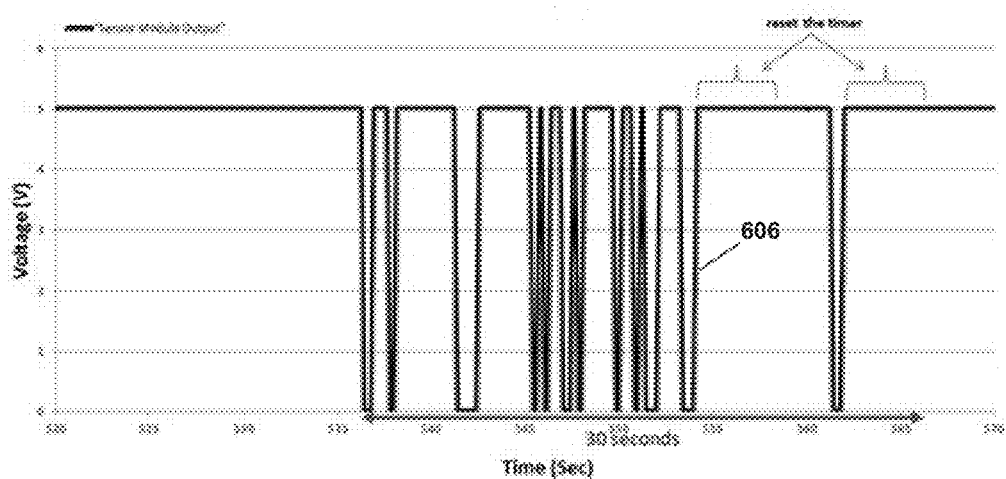
FIG. 6C is a graph illustrating an example of a binary digital output based on the detector output in FIG. 6B, where the bubbles are insufficient to trigger an out-of-product alarm.

FIG. 6C is a graph illustrating an example of binary digital output 606 based on the detector output in FIG. 6B. In some examples, system controller 104 receives the detector signal as a binary output from sensor assembly 200 or converts the signal from sensor assembly 200 to a binary output, where a voltage of 5 indicates a product present state and a voltage of 0 indicates an out-of-product state. If an out-of-product state is present, an out-of-product timer is triggered. However, if product is present for a threshold product present time period while the out-of-product time is running, the out-of-product timer will be reset. In another example, sensor controller 258 can convert the detector signal to a binary output, start an out-of-product timer if an out-of-product state is determined, and reset the out-of-product timer if a product present state is detected for a threshold product present time period.

FIG. 6C also shows what occurs when sensor assembly 200 filters small bubbles like the small bubble shown in FIG. 6A. Sensor assembly 200 may determine that a single bubble does not meet a threshold filter time to indicate an out-of-product state, and as a result, the binary output shown in FIG. 6C will reflect a product present state. If a single bubble meets the threshold filter time to indicate an out-of-product state, the binary output shown in FIG. 6C will reflect an out-of-product state.

It should be noted that the graphical diagrams are shown in FIGS. 4A-4B, 5A-5C, and 6A-6C for exemplary purposes only. Various other forms of detector outputs (having different graphical profiles) may be generated when detecting different fluids, and the detector outputs will depend upon the turbidity and/or transparency of the fluid.

The invention claimed is:

1. A method for checking for an absence of a product in a fluid delivery medium for delivering the product to a fluid dispensing site, the method comprising:
   performing an out-of-product check with an optical sensor assembly connected to the fluid delivery medium, the out-of-product check comprising:
      directing light into the fluid delivery medium;
      generating a detector output based on detected light within the fluid delivery medium;
      determining an out-of-product state within the fluid delivery medium based on a comparison of the detector output to an out-of-product threshold;
      starting an out-of-product timer, when the out-of-product state is determined;
      determining an out-of-product event when the out-of-product timer reaches a threshold out-of-product time period;
   running an alarm cycle with a controller upon determination of the out-of-product event;
   performing a product present check, the product present check comprising:
      directing light into the fluid delivery medium;
      generating a detector output based on detected light within the fluid delivery medium
      determining a product present state within the fluid delivery medium based on a comparison of the detector output to a product present threshold;
      starting a product present timer, if the product present timer has not already been started, when a product present state is determined; and
      determining a product present event when the product present timer reaches a threshold product present time period; and
   stopping the out-of-product timer upon determination of the product present event.

2. The method of claim 1, wherein the threshold out-of-product time period is a predetermined time period, between fifteen seconds and forty-five seconds.

3. The method of claim 2, wherein the threshold out-of-product time period is thirty seconds.

4. The method of claim 1, wherein the out-of-product event is determined for the threshold out-of-product time period if an out-of-product state is determined at least once every 100 milliseconds.

5. The method of claim 1, wherein running the alarm cycle comprises at least one of turning on a visual indicator and turning on a sound alarm.

6. The method of claim 5, wherein running the alarm cycle further comprises:
checking if a mute button is pressed;
turning off the sound alarm if the mute button is pressed; and
turning on the sound alarm if a mute timeout period has passed.

7. The method of claim 5, wherein running the alarm cycle further comprises:
checking if an alarm timeout period has passed; and
turning off the sound alarm if the alarm timeout period has passed.

8. The method of claim 1, wherein executing a corrective action comprises at least one of shutting off the fluid dispensing site, shutting off a pump for pumping the product to the fluid dispensing site, refilling the product reservoir, and replacing the product reservoir.

9. The method of claim 1, wherein the threshold product present time period is between ten milliseconds and five seconds.

10. The method of claim 9, wherein the threshold product present time period is three seconds.

11. The method of claim 1, further comprising canceling the alarm cycle and resuming normal operation when the product present signal is received by the controller.

12. The method of claim 1, wherein an out-of-product state is determined if the detector output satisfies the out-of-product threshold for at least a predetermined filter time.

13. An out-of-product alarm system comprising:
a fluid dispensing system comprising:
a product reservoir;
a fluid dispensing site; and
a fluid delivery medium for delivering a product from the product reservoir to the fluid dispensing site;
a sensor assembly connected to the fluid delivery medium, the sensor assembly comprising:
an emitter that directs light into the fluid delivery medium in which presence or absence of a product is to be determined;
a detector that generates a detector output based on detection of light transmitted through the fluid delivery medium; and
a sensor controller that determines an out-of-product state within the fluid delivery medium based on a comparison of the detector output to an out-of-product threshold and a product present state within the fluid delivery medium based on a comparison of the detector output to a product present threshold;
an out-of-product timer configured to start when the out-of-product state is determined by the sensor controller;
a product present timer configured to start when the product present state is determined by the sensor controller; and a system controller configured to generate at least one of a visual alarm and a sound alarm when the out-of-product timer reaches a threshold out-of-product time period, indicating that an out-of-product event is determined.

14. The out-of-product alarm system of claim 13, wherein the system controller is configured to initiate a corrective action when the out-of-product event is determined.

15. The out-of-product alarm system of claim 14, wherein the corrective action is at least one of shutting off the fluid dispensing site, shutting off a pump for pumping the product to the fluid dispensing site, refilling the product reservoir, and replacing the product reservoir.

16. The out-of-product alarm system of claim 13, wherein the fluid dispensing system further comprises a pump for pumping the product from the product reservoir, through the fluid delivery medium, and into the fluid dispensing site.

17. The out-of-product alarm system of claim 13, wherein the fluid dispensing site is a washing machine or a warewashing machine.

18. The out-of-product alarm system of claim 13, wherein the fluid delivery medium is selected from the group consisting of transparent tubing, translucent tubing, or braided tubing.

19. The out-of-product alarm system of claim 13, wherein the fluid delivery medium is selected from the group consisting of polyethylene tubing, ethylene-vinyl acetate tubing, and polytetrafluoroethylene tubing.

20. The out-of-product alarm system of claim 13, wherein the product is at least one of a transparent product or a turbid product.

21. The out-of-product alarm system of claim 13, wherein the sensor assembly includes a liquid tight enclosure that houses the emitter, the detector, and the sensor controller.

22. The out-of-product alarm system of claim 21, wherein the housing is transparent.

23. The out-of-product alarm system of claim 13, wherein the sensor assembly further comprises a visual indicator configured to provide a visual indication when the sensor controller determines an absence of product for the threshold out-of-product time period.

24. The out-of-product alarm system of claim 13, wherein the system controller is configured to reset the out-of-product timer when the product present timer reaches a threshold product present time period indicating a product present event.

25. A method for checking for an absence of a product in a fluid delivery medium for delivering the product to a fluid dispensing site, the method comprising:
performing an out-of-product check with an optical sensor assembly connected to the fluid delivery medium, the out-of-product check comprising:
directing light into the fluid delivery medium;
generating a detector output based on detected light within the fluid delivery medium;
determining an out-of-product state within the fluid delivery medium based on a comparison of the detector output to an out-of-product threshold;
starting an out-of-product timer, when the out-of-product state is determined; and
determining an out-of-product event when the out-of-product timer reaches a threshold out-of-product time period;
running an alarm cycle with the controller upon determination of the out-of-product event;
executing a corrective action in response to the alarm cycle;

performing a product present check, the product present check comprising:
- directing light into the fluid delivery medium;
- generating a detector output based on detected light within the fluid delivery medium; and
- determining a product present state within the fluid delivery medium based on a comparison of the detector output to a product present threshold;
- starting a product present timer, if the product present timer has not already been started, when a product present state is determined; and
- determining a product present event when the product present timer reaches a threshold product present time period;

stopping and resetting the out-of-product timer upon determination of the product present event; and canceling the alarm cycle upon determination of the product present event.

\* \* \* \* \*

UNITED STATES PATENT AND TRADEMARK OFFICE
CERTIFICATE OF CORRECTION

PATENT NO. : 10,072,962 B2  
APPLICATION NO. : 15/202002  
DATED : September 11, 2018  
INVENTOR(S) : Husam Ismail et al.

Page 1 of 1

It is certified that error appears in the above-identified patent and that said Letters Patent is hereby corrected as shown below:

On the Title Page

Column 1, Item (72) in "Inventors", Line 1, delete "Eagen" and insert -- Eagan --, therefor.

In the Claims

In Column 18, Line 46, Claim 1, after "determined;" insert -- and --.

Signed and Sealed this  
Fifth Day of February, 2019

Andrei Iancu  
*Director of the United States Patent and Trademark Office*